United States Patent
MacLeod et al.

(10) Patent No.: US 6,638,414 B2
(45) Date of Patent: *Oct. 28, 2003

(54) ELECTRODE DESIGN FOR ELECTROCHEMICAL MACHINING OF GROOVES

(75) Inventors: Donald J. MacLeod, Santa Cruz, CA (US); Klaus D. Kloeppel, Watsonville, CA (US); Wesley R. Clark, Watsonville, CA (US); Roger A. Addy, Gilroy, CA (US)

(73) Assignee: Seagate Technology LLC, Scott Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/919,746

(22) Filed: Jul. 31, 2001

(65) Prior Publication Data

US 2001/0050235 A1 Dec. 13, 2001

Related U.S. Application Data

(63) Continuation of application No. 09/326,443, filed on Jun. 4, 1999, now Pat. No. 6,267,869.
(60) Provisional application No. 60/088,126, filed on Jun. 4, 1998.

(51) Int. Cl.$^7$ ............................ C25F 3/00; C25D 17/00; C25D 17/10
(52) U.S. Cl. ................ 205/668; 204/224 M; 204/280
(58) Field of Search .................... 204/224 M, 280; 205/640, 666, 668

(56) References Cited

U.S. PATENT DOCUMENTS 4,690,737 A * 9/1987 Vishnitsky .................. 205/670

* cited by examiner

*Primary Examiner*—Patrick Ryan
*Assistant Examiner*—Thomas H. Parsons
(74) *Attorney, Agent, or Firm*—Moser, Patterson & Sheridan LLP

(57) ABSTRACT

Apparatus for defining patterns electrochemically on conductive materials by forming the patterns as conductive features of a tool, providing insulative properties about the conductive features so the patterns are defined; then providing an immersive medium including an etchant or plating material for defining the pattern on a workpiece, providing an electric direct current so that the immersive medium is concentrated at desired locations defined by the conductive features on the conductive materials; and etching the conductive materials by applying the electric current in a quantity and for an elapsed time to etch or plate patterns in or on the conductive materials.

12 Claims, 8 Drawing Sheets

A-A

A-A

ELECTRODE DESIGN FOR ELECTROCHEMICAL MACHINING OF GROOVES

CROSS-REFERENCE TO RELATED APPLICATION

This continuation application to U.S. application Ser. No. 09/326,443 filed Jun. 4, 1999 (now U.S. Pat. No. 6,267,869).

The present application claims priority to Provisional Application No. 60/088,126 filed Jun. 4, 1998 by McLeod et al., which is incorporated herein by reference.

BACKGROUND OF THE INVENTION

1. Field of the Invention

This invention relates to electrochemical machining (ECM), and particularly to the ECM of fluid dynamic bearing and race surfaces.

2. Description of the Prior Art

In the prior art, microfeatures on surfaces, such as the fluid dynamic grooves on bearing and race surfaces, were formed by machining or casting.

Microfeatures on surfaces in many applications involve the machining of very hard materials, such as ceramics or hard metals. These materials are difficult to work with, and often the result of machining the features was undesirable displacement of the material, resulting in "lips" or "spikes", also called "kerf" by many machinists; small eruptions of materials along the edges of the grooves or other features. Removing the undesired material often meant polishing or deburring, while great care is required to avoid damage to the surface with microfeatures.

For example, shallow trenches with a contoured cross-section are often made by pressing on the material with a ball of hard material. This type of manufacture is known to preferentially pile up material along the edge of the trench. Since the edge of the trench may meet the original surface at a shallow angle, the pile up of material can be very difficult to remove.

Another method of machining which may comprise a machined surface, grooves involves electrochemical machining. In electrochemical machining, an electrode is applied to a work which may comprise a machined surface piece where it is desired to form a feature. Both the electrode and the work piece are in an aqueous electrolyte containing a salt usually $NaNO_3$ or $NaCl$. A current from the electrode to the work piece causes the ions of the workpiece to dissolve in solution.

In the following discussion, etching or removal of material is assumed, but it will be obvious that similar results would be achieved in electrodepositing material, such as in electroplating materials onto a medium.

Etching occurs where the current reaches the work piece. This effect is pronounced enough to allow microfeatures to be etched in the work piece with only the effect of a cleaning operation elsewhere, which is often independently desirable.

Electrochemical etching avoids the problem of material pile up, since there is no physical pushing action to cause a rearrangement of the material, but creates problems of its own. One problem introduced by electrochemical machining is that the electrode requires a finite time for material removal. The electrode is often complex and difficult to make; in one prior art approach to making grooves for a bearing this insulation is placed on the surface to be grooved. This makes for slow, tedious work, and greatly increases costs while limiting productive throughput.

The present invention addresses the above problems, and introduces benefits not discussed in the interests of brevity and clarity in the discussion above.

SUMMARY OF THE INVENTION

The present invention overcomes the problems of the art as previously known by providing an electrode which covers the entire surface of a fluid dynamic bearing, whether a thrust bearing or journal bearing, on which grooves are to be formed. The electrode has grooves machined or otherwise formed in it and lands between these grooves which define the pattern of the bearing grooves which are to be formed on the bearing surface. By then connecting the bearing element and the electrode element across an appropriate current supply, and causing electrolyte to flow between the two materials, the desired groove pattern is quickly and efficiently formed. The present process and apparatus of this invention allows for a complete set of grooves to be formed on a shaft, a sleeve surrounding a shaft, a thrust plate or counter plate, or either the male or female section of a conical bearing, simply by changing the shape of the surface electrode and forming the appropriate pattern of grooves and lands thereon.

DETAILED DESCRIPTION OF THE INVENTION

Electrochemical machining (ECM) has many advantages over the conventional mechanical machining. Material displacement, resulting in "bumps", "spikes", also called "kerf" in machining, which are common with mechanical machining, is avoided by electrochemical machining. ECM is also well suited to machining microfeatures, where mechanical tools may be too fragile, or if not fragile, too large. However, ECM as it was practiced in the prior art introduces other problems. One problem is that ECM has involved using an electrode to essentially "paint" microfeatures, a slow and expensive process.

Figure 1:
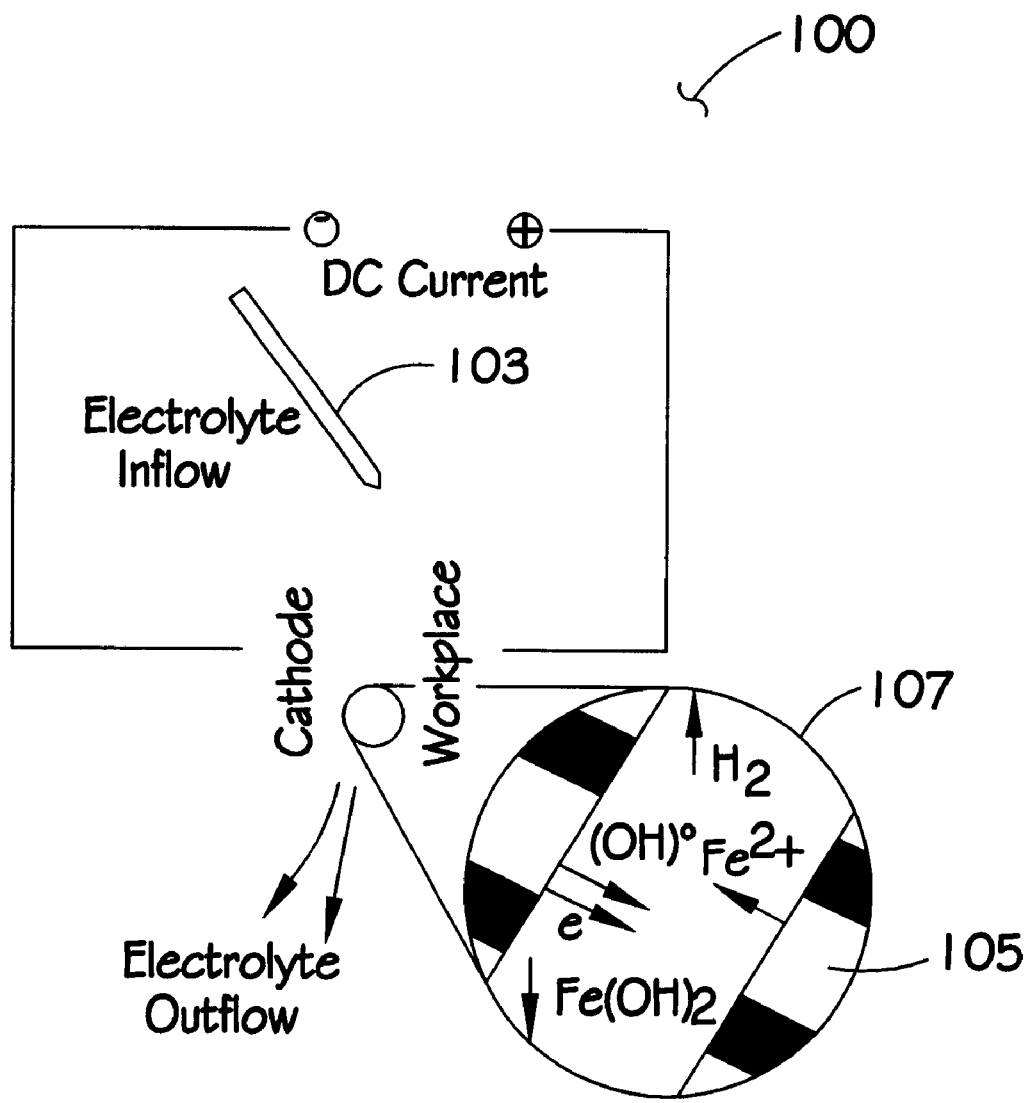
FIG. 1 is an embodiment of the prior art with an idealized view showing an electrode of a type often used.

In FIG. 1, a prior art embodiment of ECM 100 is illustrated in an idealized view. The electrode or tool for ECM 103 is shown inside a conceptual direct current (DC) circuit; where the electrode 103 is to be connected to the cathode, and the workpiece 105, in this case a ferrous material, is illustrated in a blow up of the work area 107. In this embodiment, a salt solution plus electrical flow is being used to etch ferrous material (Fe), with ferrous hydroxide resulting. As illustrated, the ferrous hydroxide is discharged in a flow of the etchant.

The theory of operation is that negative hydroxyl (OH) ions will be repelled from the negative cathode, while ferric (Fe) ions will be repelled by the positive anode, which is the workpiece. The ferric and hydroxyl ions are thereby encouraged to associate. As a practical matter, since the hydroxyl ion is very mobile, while the ferrous ion is more tightly bound, the hydroxyl ion is often considered as "attacking" the ferrous ion and etching it out of the workpiece under the influence of the electric field.

As the electric current increases, the hydroxyl ions, which may be considered to be the conductors of the DC current, also increase, and as they attack the ferrous ions, giving up their excess electric charge in the process, they "rip" ferrous ions out of the workpiece. The current essentially causes the ions of the workpiece to dissolve in solution.

Figure 2:
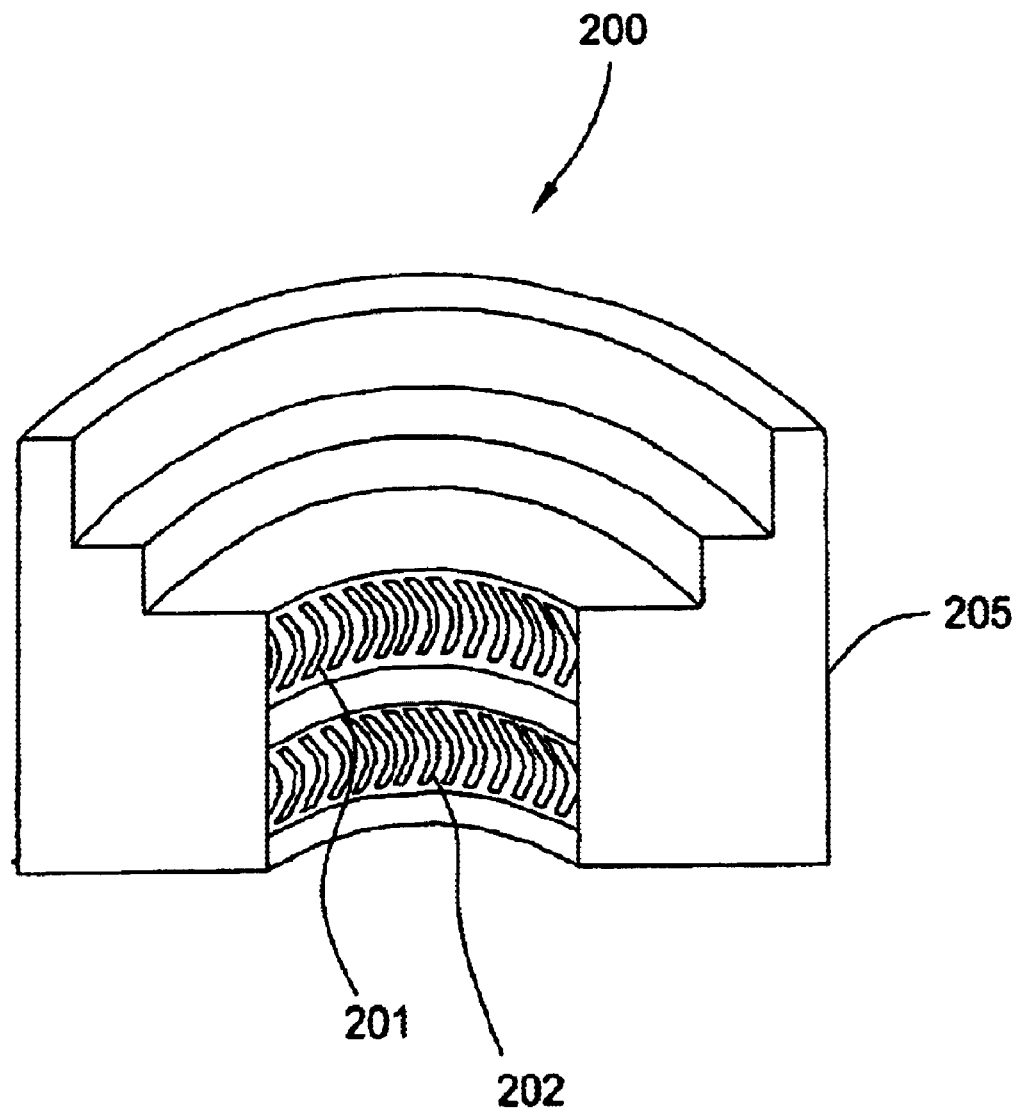
FIG. 2 is an embodiment of the invention showing a section of a bearing race with two fluid dynamic bearing surfaces included. In the prior art, details such as this within a bore would be difficult or even impractical, but with the present invention can be done with a shaft-shape insertable tool.
Figure 3:
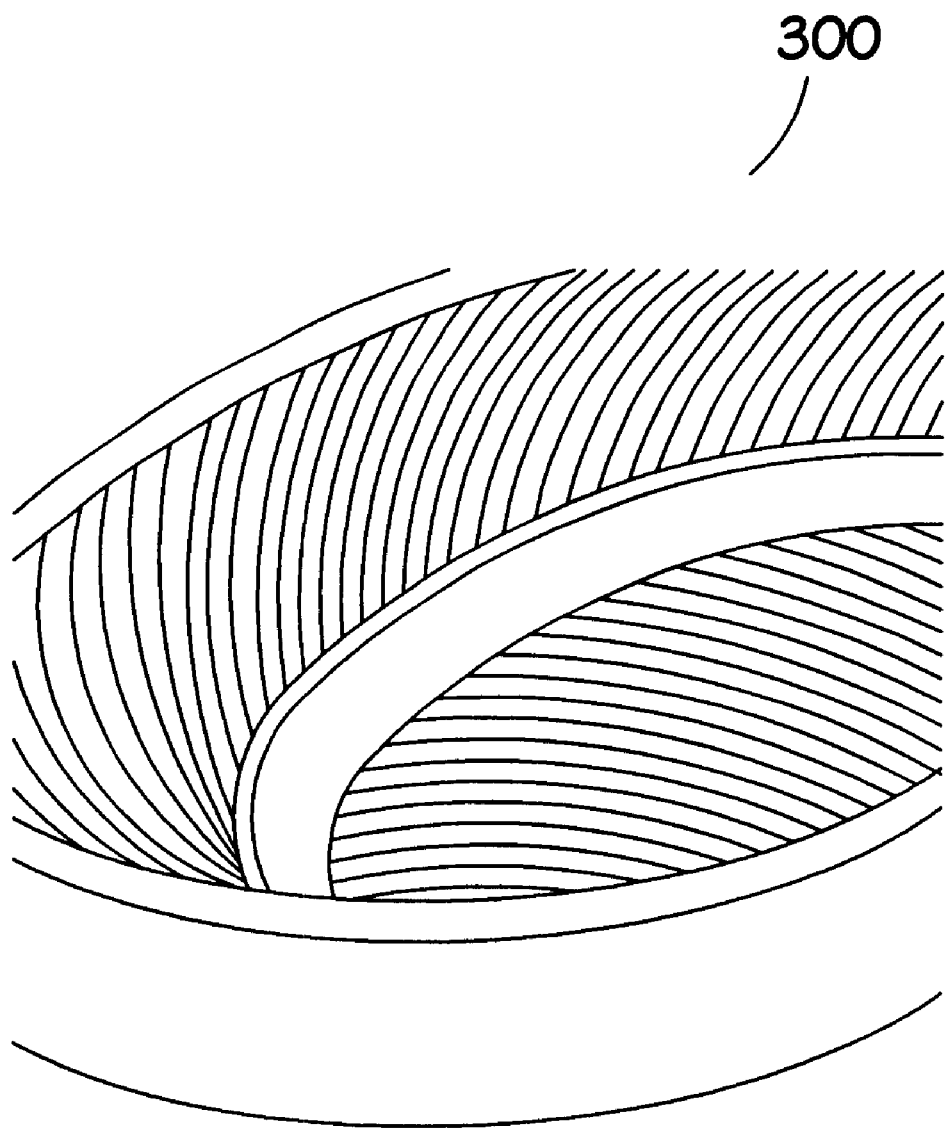
FIG. 3 is an embodiment of the invention showing a conical end bearing surface combined with a cylindrical bearing surface in a race for a shaft support.

FIG. 2 is an embodiment useful in an ECM machine 200 of either the prior art or of the invention; the method of practicing ECM is not affected at this level. The electrode or tool is typically a sharp pointed object in the prior art, but is larger with the invention since it must be capable of supporting a master imprint of an entire section of a fluid bearing. The invention as the effect of simultaneously applying multiple parallel electrodes 201, 202, compare to the prior art. The workpiece (shown in FIG. 4) is disposed to rotate in this embodiment, with an electrolyte dispenser to apply a constant flow of etchant to the interface between the electrode and the workpiece, but it will be appreciated that any embodiment that brings the tool 205 proximal to the workpiece with an electrolyte dispenser or other means for providing a flowing intermediary between the workpiece and the tool for modifying the workpiece is anticipated hereby. A means for providing a DC current between the tool 205 and the workpiece through the electrolyte or other intermediary herein provided by electrolyte dispense, thereby using ECM to modify the workpiece, is provided, but not shown. Any of the many means for providing a negative or positive DC voltage and current to the workpiece and a positive or negative DC voltage and a current to the tool 205 is within the purview of this invention.

Figure 4:
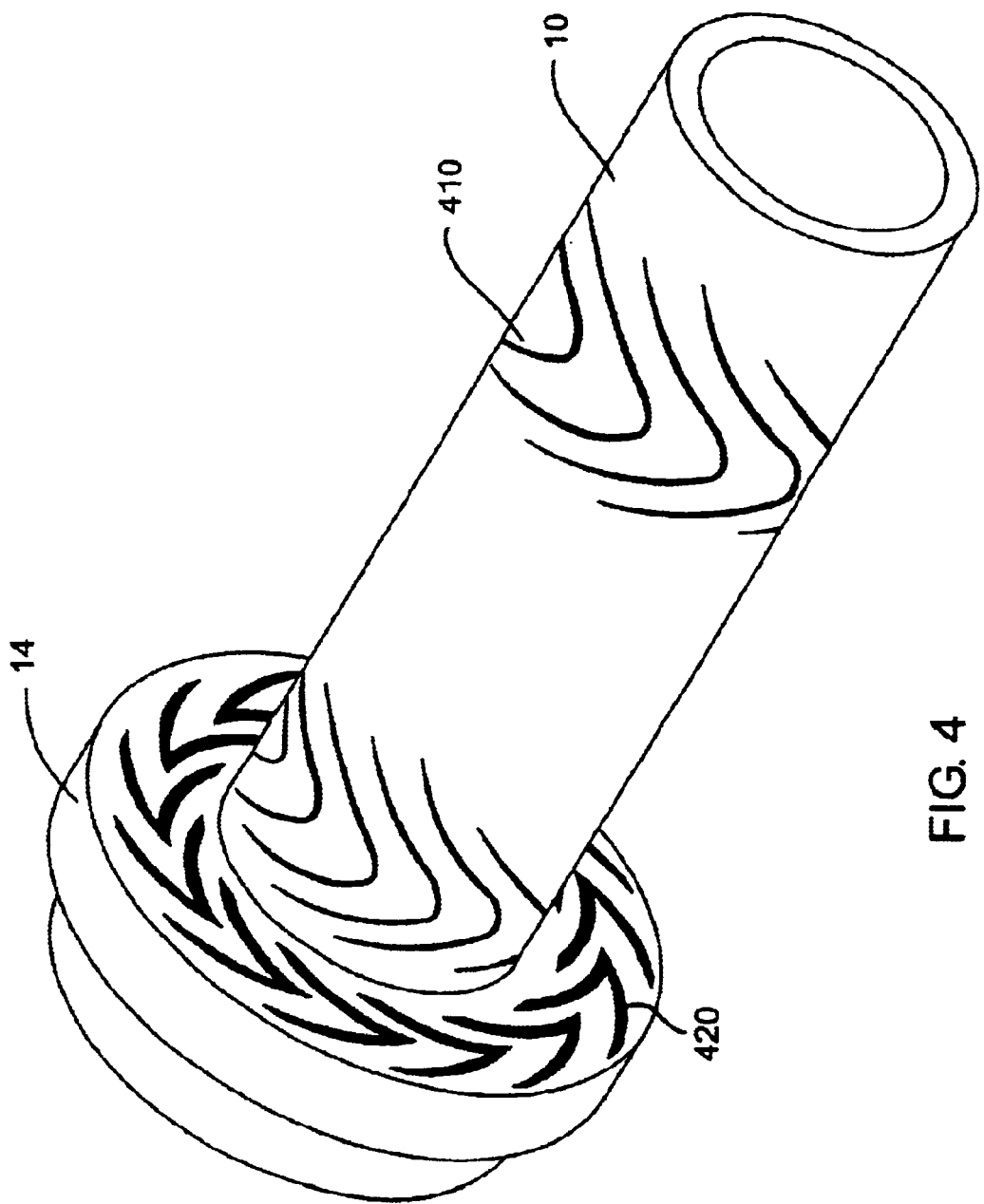
FIG. 4 is an embodiment of the invention showing how multiple bearing surfaces may be incorporated into a tool comprising a shaft with provisions for forming a bearing end surface for lateral bearing support on the finished part being built.

FIG. 4 shows a fluid dynamic incorporating a shaft 10 rotating inside a bushing or sleeve (not shown). One of the two opposing surfaces, in this case the shaft, carries cylindrical sections of spiral grooves 410. A thrust plate 14, rotating in a recess in the sleeve, is also provided with concentric spiral groove sections 420 as shown. The relative rotation of the shaft and sleeve combination pumps the fluid as a function of the direction and angle of the grooves with respect to the sense of rotation of the shaft 10 and thrust plate 14. Pumping action builds up multiple pressure in zones along the journal and thrust plate, maintaining a fluid film between the relatively rotating parts, and providing stiffness for the bearing. The grooves are of the type which are readily formed by the electrodes used in the present invention. The grooves must be very clean and well-formed, but with no "kerf" n the edges due to the manufacturing process. Also, since this is a common application, the manufacturing process requires high volumes with high quality of the grooved parts. This in turn requires precision tooling as is taught by the invention, and operation on as large an area of a workpiece as practical, so that the time spent on each workpiece may be minimized.

Figure 5A:
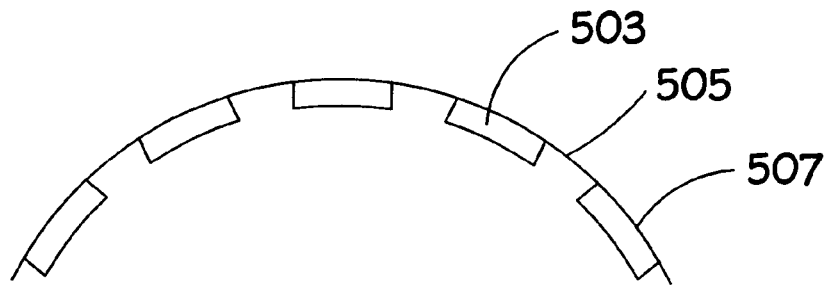
FIGS. 5A and 5B are embodiments of the invention showing a tool end for forming an internal bearing surface, with a section view in FIG. 5B showing the insulation between the electrodes on the tool.
Figure 5B:
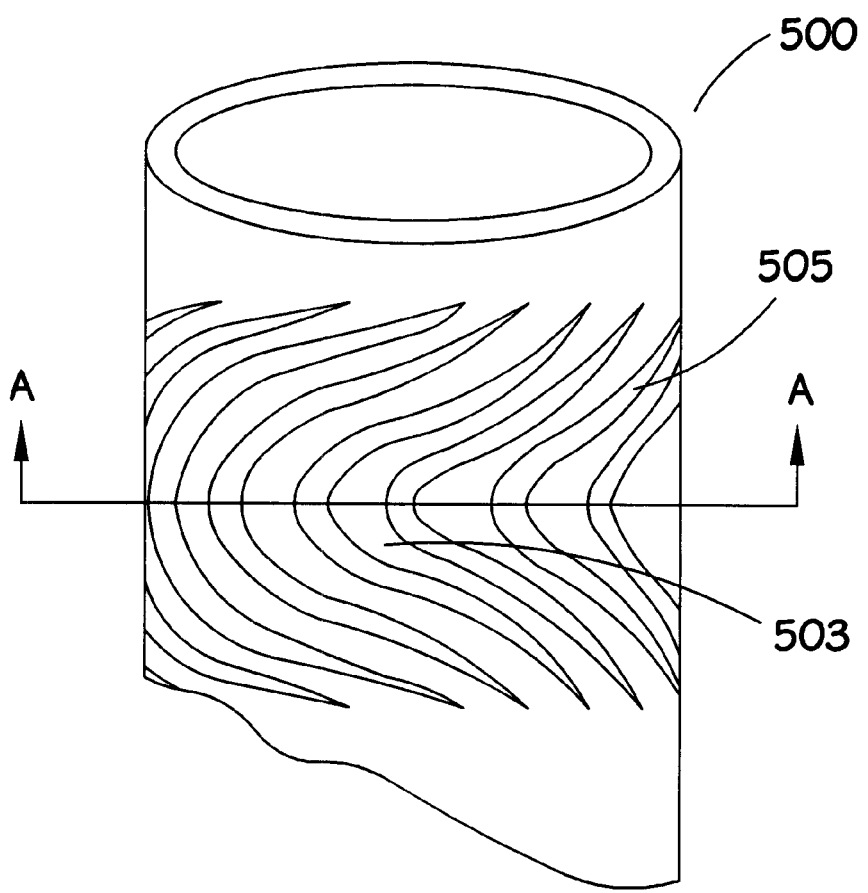

FIG. 5 is an embodiment of a cylindrical tool of this invention shown in cross section 500. In this embodiment, grooves or slots 503 were formed between teeth 505. It is recognized, of course, that grooves will be formed in the workpiece opposite the teeth or lands 505. An insulator 507 was then provided in grooves 503, for example, by applying a material such as epoxy or acrylic material to cover both the teeth and intermediate slots, then polishing the outside of the tool surface. Rotating the tool 500 and applying a spaced polishing tool will cause the applied material to be removed outside the slots, but left in the slots, as shown.

In use, the cylindrical tool 500 has teeth 505 in the shape of a pattern of the slots or grooves to be formed on the surface of the bearing race, which in this case would be a bearing sleeve. By providing electrolyte between the cylindrical tool and surrounding sleeve, material will be removed from the sleeve in the pattern of the teeth 505, but not the intermediate slots. The tool can be the length of all bearings to be formed on a complementary shaft or sleeve, so that all the grooves of a shaft supporting fluid dynamic bearing can be formed at once. The tool can also be used to form grooves for a bearing on the inner surface of a bearing sleeve.

Figure 6:
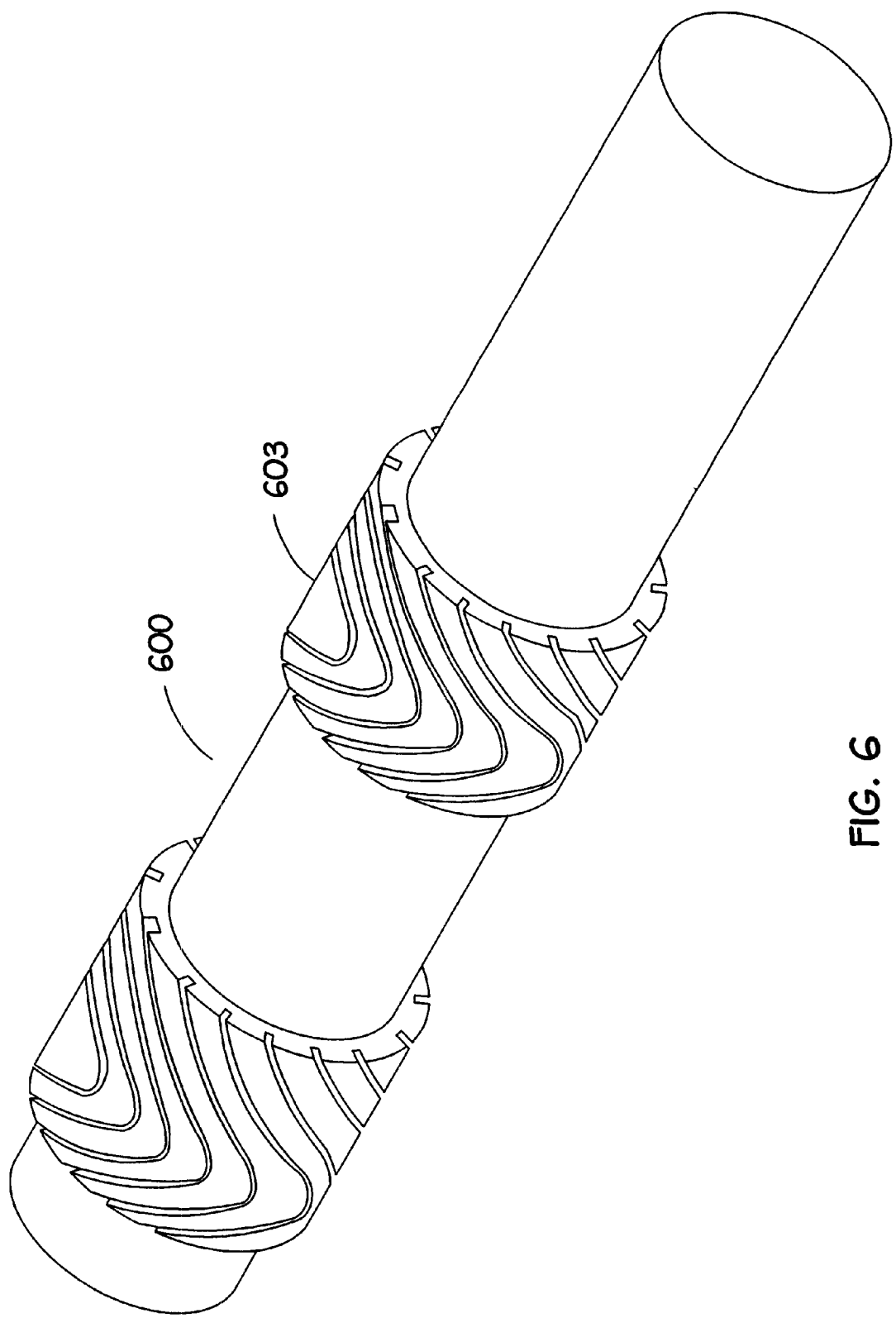
FIG. 6 is an embodiment of the invention showing how a conductive tool is built up, in this case with brass. The tool will then be coated with an insulator and polished, forming the cross-section of FIG. 5B.

FIG. 6 is a partial view of an embodiment of a cylindrical tool of this invention 600; in this case a bore machining tool for introducing grooves into a bore hole in a workpiece. Section A—A illustrates where the view of FIG. 5 might have been taken.

Raised tooth, also called "kerf", might occur with the prior art methods, as shown herein at 603. One method of the prior art for providing grooves, especially when an arced groove rather than the square groove of FIG. 5 is desired, is to use a hard ball under pressure against the workpiece, whereby the hard ball is made to sink into the workpiece. Since the displaced material is not removed, it "flows" outward from the ball, and some of it becomes a raised tooth or "kerf" as discussed before. Such kerf must be removed before the shaft could be used as an electrode; however, once the electrode can be reused many times to form corresponding grooves on multiple sleeves, the issue of key removal is dramatically simplified.

Figure 7:
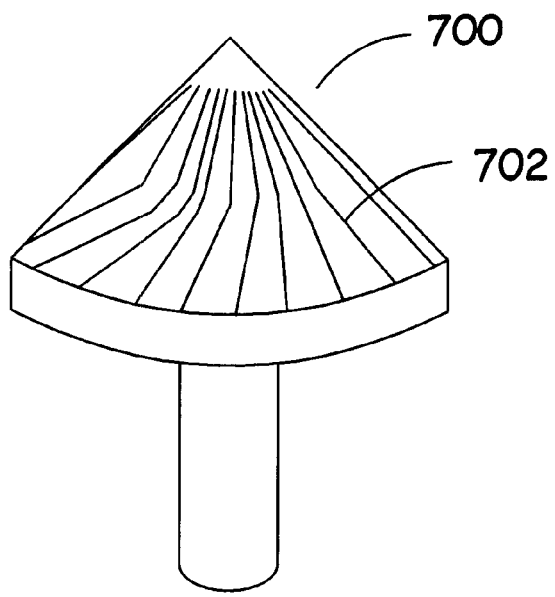
FIG. 7 is an embodiment of the invention showing an application in which microfeatures are to be introduced to a conical depression by a tool with an external conical shape for fitting therein.

FIG. 7 is an embodiment of the invention 700. A conical tool for providing grooves for one surface of a conical bearing is disclosed. Conical bearings are becoming more common, especially in disc drives, as they provide both radial and lateral stability, thereby saving space. Such bearings are difficult to form in mass production machining. However, by utilizing the electrochemical machining approach of the present invention, single or limited number of conical elements can be machined or otherwise formed according to the invention, and each used to make a large number of conical grooved surfaces. For example, FIG. 7 shows such a male cone 700, with lands or raised segments 702 corresponding to the groove pattern desired to be etched on a female cone.

Figure 8:
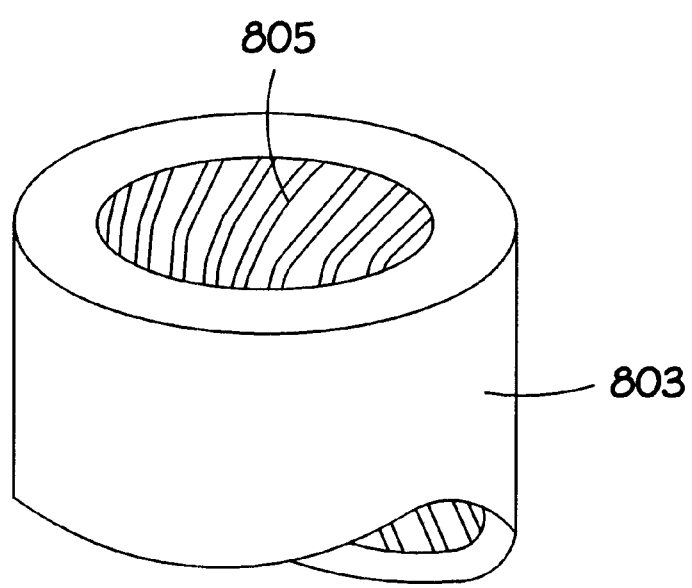
FIG. 8 is an embodiment of the invention showing a bore in a tool for forming microfeatures on an included shaft.

FIG. 8 is an embodiment of the invention comprising a perspective view of a sleeve 803 having features 805 on the interior surface corresponding to the grooves to be formed on the surface of a shaft for a fluid dynamic bearing such as shown above. A cylindrical tool 803 for providing grooves on a shaft or rod introduced into a bore in tool 803 using the pattern 805 is shown.

Figure 9:
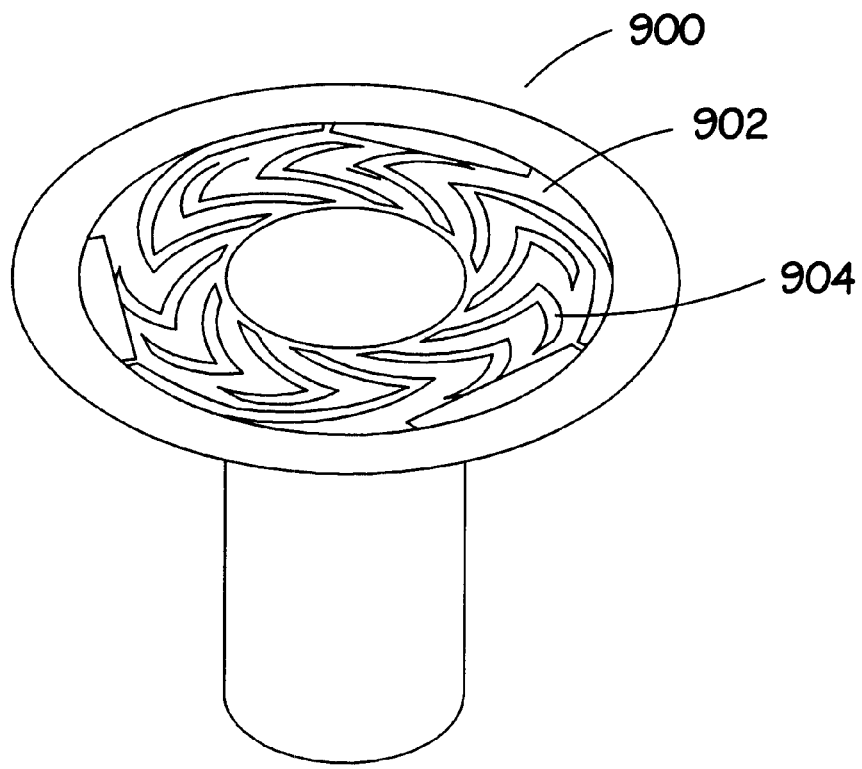
FIG. 9 is an embodiment of the invention in which a pattern on a flat tool has been configured in order that the pattern may be electromechanically machined on a flat surface.

FIG. 9 is an embodiment of the invention 900 where a pattern in accordance with the invention is shown on a flat tool surface 902. Here the lands 902 are defined so that a groove pattern such as on a thrust plate shown above can be established.

Figure 10:
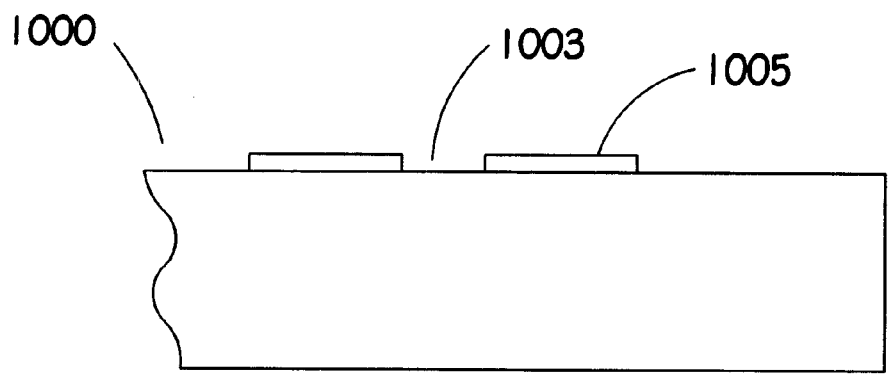
FIG. 10 is an embodiment of the invention showing a cross sectional view of the flat tool of FIG. 9 demonstrating how an insulator may be used in defining a pattern of microfeatures.

FIG. 10 is an embodiment of the invention 1000 illustrating how the tool of FIG. 9 is prepared. In this embodiment, the tool conductive part is left flat, and an insulating layer is adhered to the tool surface and patterned as shown. This is a lower cost, faster way of providing the tool of this invention, since adding an insulator is a simpler task than cutting or etching the tool surface. As will be seen by view A—A taken of the tool cross section, a metal electrode 1003 forming a tool conducive part has a pattern defined by a patterned insulator 1005 on the surface. Thereby no machining of the metal of the tool is required.

While the examples given are intended to be as complete and instructive as practical, clarity dictates keeping the disclosure to a reasonable size. However, other embodiments that will use this invention will be clear to those in the art, and this invention applies to all such other embodiments as if they were specifically detailed herein.

What is claimed is:

1. Apparatus for defining patterns electrochemically on conductive materials, comprising:
    a tool comprising conductive patterns on a surface thereof;
    insulation about said conductive features whereby said patterns are defined, the insulation not rising about the surface of the conductive pattern;
    an immersive medium including an etchant for etching said pattern on a workpiece;
    a source of an electric direct current, whereby said immersive medium is concentrated at desired locations defined by said conductive features on said conductive materials; and
    a control for applying said electric current in a quantity and for an elapsed time whereby said patterns are defined in said conductive materials by said etchant.

2. The apparatus of claim 1 comprising:
    said tool including a sleeve having a pattern on an inside surface, whereby cylindrical conductive materials can be inserted within said sleeve for transferring said pattern onto said conductive materials.

3. The apparatus of claim 1 comprising:
    said tool being a cone shape with the pattern thereon, whereby said cone is adapted to be inserted within concave conical conductive material for transferring said pattern onto said conductive material.

4. The apparatus of claim 1 comprising:
    said tool comprising a cylinder with the pattern thereon, whereby said cylinder is adapted to be inserted within bore within said conductive material for transferring said pattern into said bore within said conductive material.

5. The apparatus of claim 1 comprising:
    said tool comprises a flat work surface and the conductive material comprises a thrust plate or counter plate, whereby said tool is adapted to face said conductive materials for transferring said pattern to said conductive materials.

6. The apparatus of claim 1 comprising:
    said patterns being formed with an insulative material adhering to said tool for transferring said pattern to said conductive materials.

7. Method for defining patterns electrochemically on conductive materials, comprising:
    providing said patterns a conductive features of a tool;
    providing insulative material about said conductive features whereby said patterns are defined, the insulative material rising only to the surface of the conductive pattern;
    providing an immersive medium including an etchant for etching said pattern;
    providing an electric direct current, whereby said immersive medium is concentrated at desired locations on said conductive materials; and
    etching said conductive materials by applying said electric current in a quantity and for an elapsed time whereby said patterns are defined in said conductive materials.

8. The method of claim 7 comprising:
    said tool comprising a sleeve having the pattern on an inside surface, and inserting cylindrical conductive materials within said sleeve for transferring said pattern onto said conductive materials.

9. The method of claim 7 comprising:
    said tool comprises a cone shape with a pattern thereon, and inserting said cone within a concave conical conductive material for transferring said pattern onto said conductive material.

10. The method of claim 7 comprising:
    said tool comprising a cylinder with the pattern thereon, and inserting said cylinder within a bore within said conductive materials for transferring said pattern into said bore within said conductive materials.

11. The method of claim 7 comprising:
    said tool comprising a plate having the pattern thereon, whereby said tool is impressed against said conductive materials for transferring said pattern to said conductive materials.

12. The method of claim 7 comprising:
    said patterns being formed with an insulative material adhering to said tool for transferring said pattern to said conductive materials.

* * * * *